O. CROSBY, E. A. WILHELM & H. LE R. BRINK.
GRAPPLE.
APPLICATION FILED OCT. 20, 1911.
1,093,832.
Patented Apr. 21, 1914.
4 SHEETS—SHEET 1.
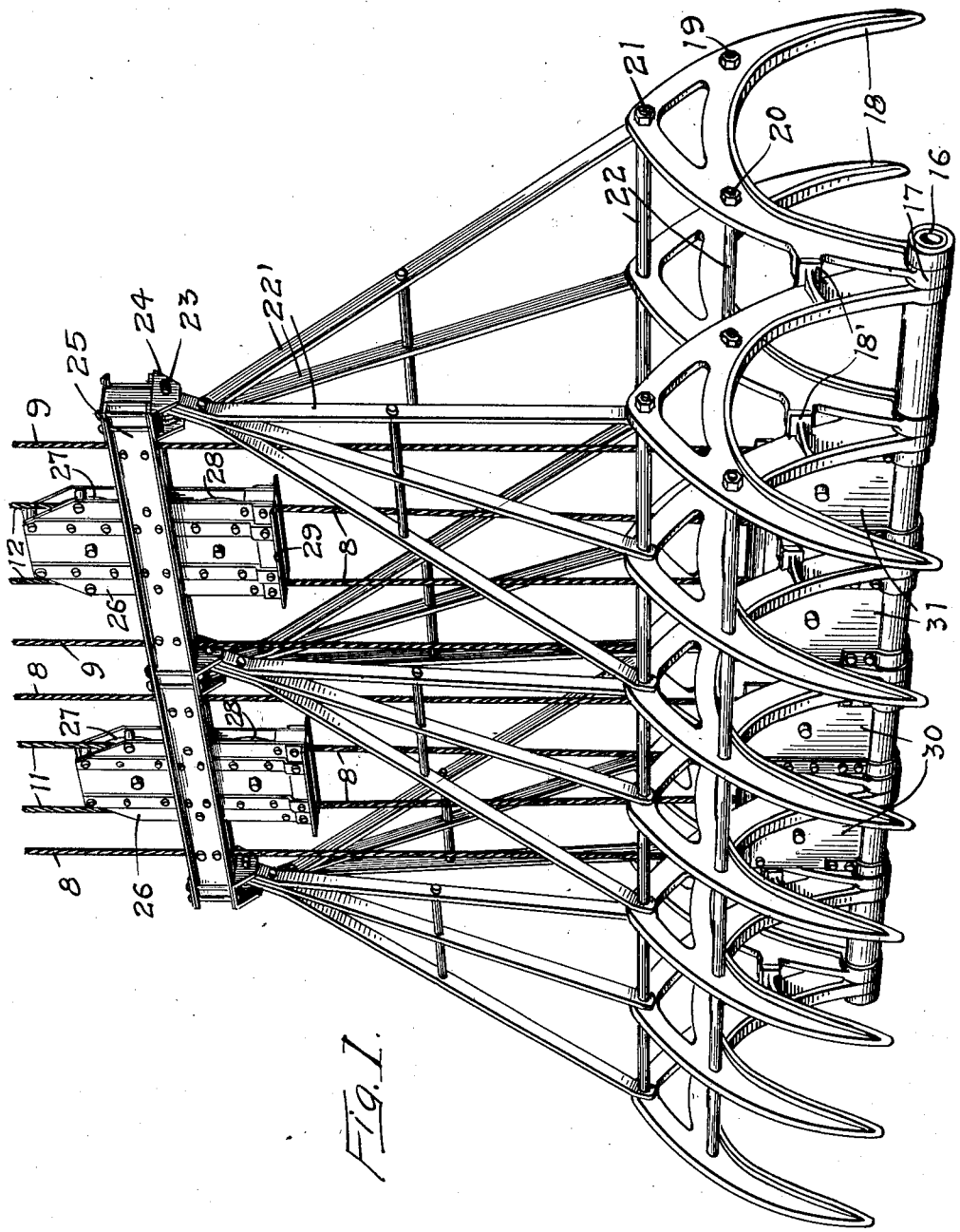
WITNESSES
INVENTORS
OLIVER CROSBY
EDWARD A. WILHELM
HARRY LEROY BRINK
BY
ATTORNEYS

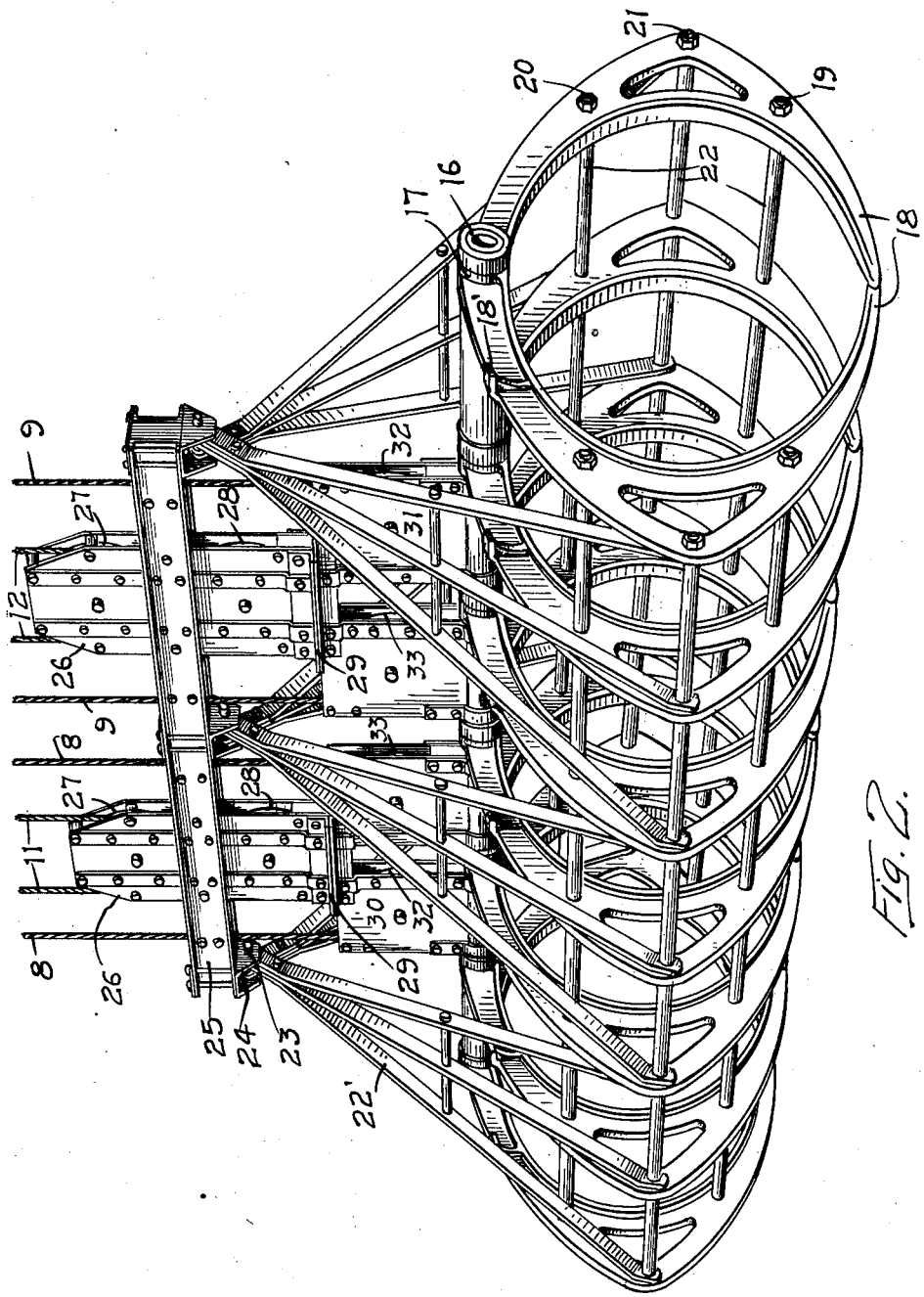

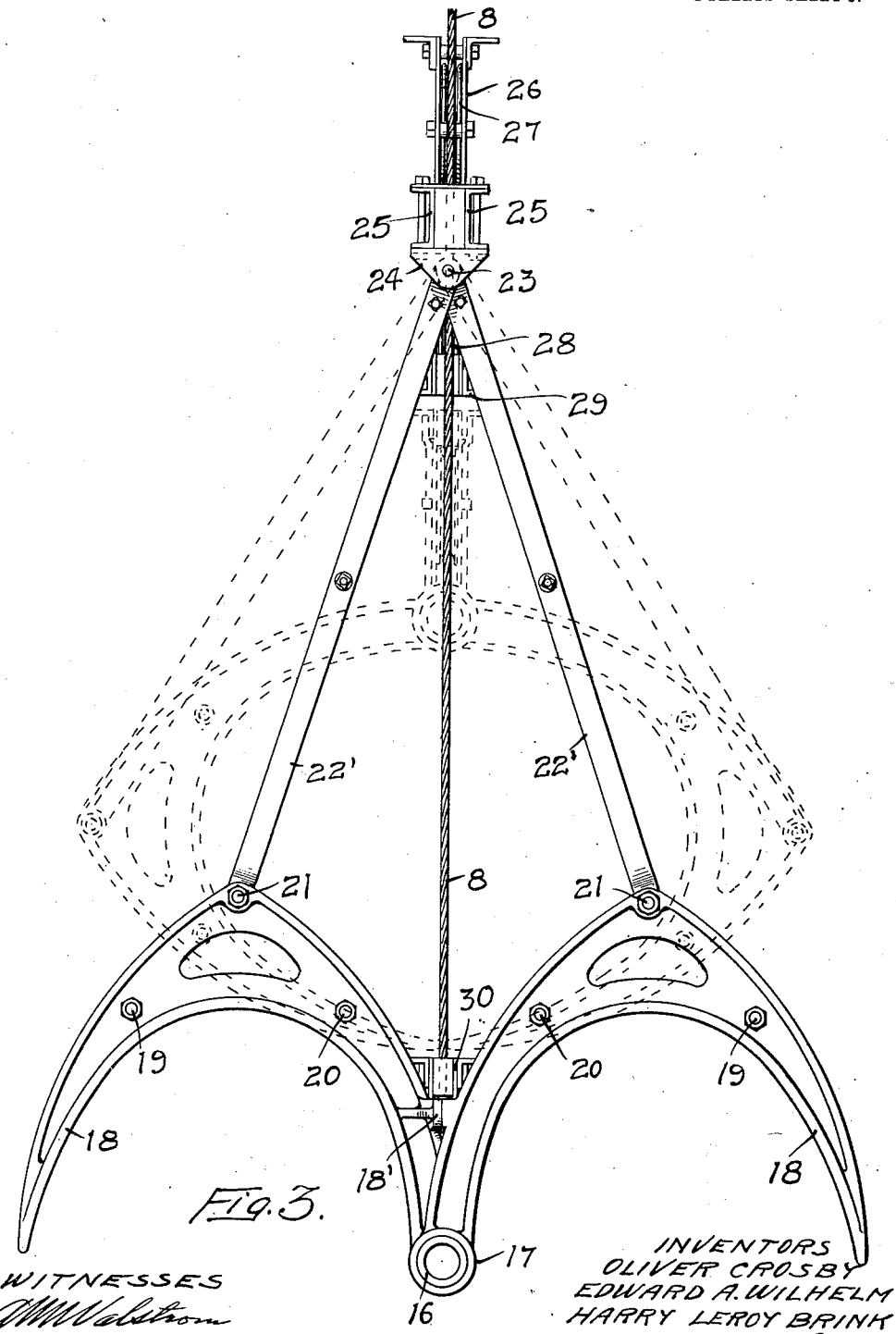

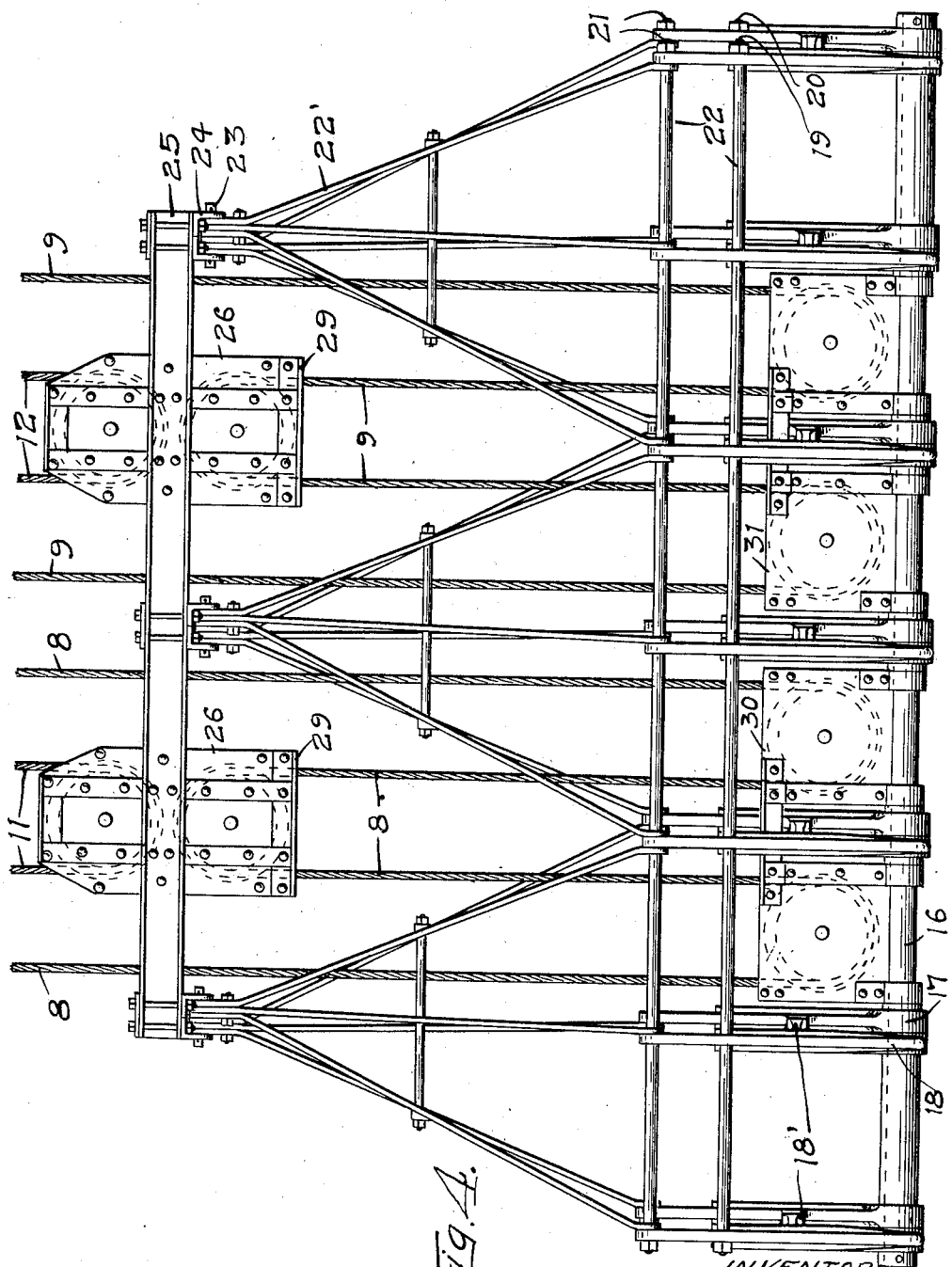

UNITED STATES PATENT OFFICE.

OLIVER CROSBY, EDWARD A. WILHELM, AND HARRY LE ROY BRINK, OF ST. PAUL, MINNESOTA, ASSIGNORS TO AMERICAN HOIST & DERRICK CO., OF ST. PAUL, MINNESOTA, A CORPORATION.

GRAPPLE.

1,093,832.  Specification of Letters Patent.  Patented Apr. 21, 1914.

Application filed October 20, 1911. Serial No. 655,778.

*To all whom it may concern:*

Be it known that we, OLIVER CROSBY, EDWARD A. WILHELM, and HARRY LE ROY BRINK, of St. Paul, Ramsey county, Minnesota, have invented certain new and useful Improvements in Grapples, of which the following is a specification.

Our invention relates to grapples applicable for various purposes, but designed particularly for handling sugar cane in bulk, and the object of the invention is to provide an apparatus by means of which a mass of sugar cane may be picked up and moved to or from a car with ease and despatch.

A further object is to provide a grapple of large capacity and comparatively simple in construction and operation.

The invention consists generally in various constructions and combinations, all as hereinafter described and particularly pointed out in the claims.

In the accompanying drawings forming part of this specification, Figure 1 is a perspective view of the grapple in its open position, ready to pick up the load, Fig. 2 is a similar view, showing the grapple in its closed position, Fig. 3 is an end elevation, showing the preferred form of grappling fingers and the position assumed by them in their open and closed position, the closed position being indicated by dotted lines, Fig. 4 is a side elevation, showing the operating means for the grappling fingers.

The grapple consists of a shaft 16 on which the hubs 17 of the grappling fingers 18 are journaled.

18′ represents stops on the grappling fingers which, as shown clearly in Fig. 1, operate to check the opening movement of the fingers. These fingers are arranged in pairs, one finger of each pair projecting laterally on one side of the shaft 16 and the other finger of the same pair on the opposite side of the shaft. The fingers on the same side of the shaft are connected and held in alinement by means of rods 19, 20 and 21, said rods being provided with spacing sleeves or tubes 22 between the arms. Links 22′ connect the rods 21 of each set of fingers with pins 23 mounted in ears 24. These ears are secured by suitable means to a beam composed, preferably, of channel bar sections 25, placed back to back with a space between them and in the space between the beam, sheave or pulley boxes 26 are mounted.

These boxes are preferably composed of plates arranged in parallel relation with a space between them and having bearings for sheaves 27 and 28, the sheaves 27 being above the supporting beam of the boxes and the sheaves 28 below the supporting beam, and said boxes are preferably located one on each side of the middle portion of the beam. The lower ends of the boxes have angle bars 29 secured thereon.

The sheave boxes are rigidly secured to the beam and when the shaft is raised to close the grapple they will contact with the shaft boxes and the arrangement of the sheaves in the boxes will prevent the beam from tilting laterally and allowing chafing or wearing of the cables. The lower ends of the links are mounted on the rods 21 between the fingers and the ends of the sleeves 22 and are thereby held in place on the rods.

On the top of the shaft 16 we prefer to provide boxes 30 and 31, secured by suitable means to the shaft and vertically movable therewith. These boxes have bearings for sheaves 32 and 33 and the cables 8 and 9 pass down around the sheaves 32 and from thence to the sheaves 28 and back down around the sheaves 33 and to the point "A" on the boom. These cables, 8 and 9, are the closing cables and operate to lift the shaft 16 so that the grappling fingers will close on the material to be gathered up. Angle bars corresponding to those above described are mounted on the upper ends of the boxes 30 and 31, and said bars have meeting faces which coöperate to form seats for the boxes when they come together in the closing of the grapple, as indicated in Fig. 2.

In closing the grapple, the parts will assume the position indicated in Fig. 2, the shaft 16 ascending until the boxes thereon contact with the lower ends of the boxes 26 and as the pull continues on the closing drum cables, the grapple will ascend after the fingers have gripped the material. During this ascending movement of the grapple the opening drum cables 11 and 12 will be kept under tension and will be wound on the opening drum by the pull of the counterweight on the line 13. When the grapple has been swung to the dumping position the opening drum is locked by a suitable means so that the opening cables will be held stationary. The closing drum is then allowed to revolve to slacken its cables and the shaft connected through the boxes 30 and 31 with the closing cables, is allowed to drop by gravity and as the beam connected with the grappling fingers by the links 22' is stationary, it is evident that, as the shaft descends, the fingers will be separated to open the grapple and discharge the load from between the fingers.

It will be noted that the cables run parallel through the grapple and that the sheaves 27 and 28 are held in vertical alinement with one another through their rigid connection with the supporting beam. It will also be noted that the manner of running the ropes through the grapple prevents any twisting or tilting movement of the beam and the upper sheaves when the closing cables are made slack to allow the grapple to open. This construction also prevents the sheave boxes from dropping out of their proper upright position and causing the cables to kink or become twisted or chafed. It is important in an apparatus of this kind, where so many running connections are made, that all the cables work smoothly and without unnecessary friction in the opening and closing of the grapple.

In various ways the details of construction herein shown and described may be modified and still be within the scope of our invention.

We claim as our invention:

1. A grappling apparatus comprising a shaft, grappling fingers journaled thereon, a beam, links connecting said beam with said grappling fingers, sheave boxes rigidly mounted on said beam and having sheaves above and below said beam, sheave boxes mounted on said shaft and having sheaves therein, closing cables having running connections with the sheaves on said shaft and with the lower sheaves on said beam, and opening cables having running connections with the upper sheaves of said beam.

2. A grappling apparatus comprising a shaft, grappling fingers journaled thereon, a beam composed of channel bars placed back to back and spaced apart, ears secured to said bars, links pivotally connected with said ears and to said grappling fingers, sheave boxes fitting between the bars of said beam and rigidly secured thereto and projecting above and below said beam and each block having a sheave above and below said beam, boxes mounted on said shaft and also having sheaves therein, closing cables having running connections with the sheaves on said shaft and with the sheaves below said beam, and opening cables having running connections with the sheaves above said beam, said grappling fingers closing when said closing cables are wound up and opening by gravity when said closing cables are released and said opening cables are held stationary.

3. A grappling apparatus comprising a shaft, grappling fingers journaled thereon, a beam composed of bars spaced apart and secured together, links pivotally connected with said bars and with said grappling fingers, sheave boxes fitting between the bars of said beam and rigidly secured thereto and projecting above and below said beam and having sheaves above and below said beam, sheave boxes mounted on said shaft and having sheaves therein, closing cables having running connections with the sheaves on said shaft and with the sheaves below said beam, and opening cables having running connections with the sheaves above said beam.

4. A grapple comprising a shaft, grappling fingers journaled thereon, a beam, middle links pivotally connected with the middle portion of said beam and with the middle fingers on said shaft, end links pivotally connected with the ends of said beam and with the outer fingers on said shaft, sheave boxes mounted on said beam between said middle and end links and having sheaves journaled therein, a pair of sheave boxes mounted on said shaft on each side of the middle portion thereof, sheaves mounted in said sheave boxes, closing cables having running connections with said shaft sheaves and with one of the sheaves in said beam boxes, there being a pair of closing cables, one for each set of shaft sheaves, and opening cables having running connections with the other sheaves of said beam boxes.

5. A grappling apparatus comprising a shaft, grappling fingers journaled thereon, a beam, links pivotally connecting said beam with said grappling fingers, sheave boxes mounted on said beam on each side of the middle portion thereof and having flanged lower ends and sheaves for said boxes, sheave boxes mounted on said shaft and arranged in pairs upon opposite sides of the middle portion thereof, flanged plates bridging the space between the shaft boxes of each pair and beneath the flanged lower ends of said beam boxes and contacting therewith when said shaft is raised, and opening and closing cables having running connections with the sheaves of said shaft boxes and with the sheaves of said beam boxes.

In witness whereof, we have hereunto set our hands this 13th day of October, 1911.

OLIVER CROSBY.
EDWARD A. WILHELM.
HARRY LE ROY BRINK.

Witnesses:
C. B. MORAN,
C. H. SCHLEMMER.

Copies of this patent may be obtained for five cents each, by addressing the "Commissioner of Patents, Washington, D. C."